US010149565B2

(12) United States Patent
Dave et al.

(10) Patent No.: US 10,149,565 B2
(45) Date of Patent: Dec. 11, 2018

(54) RECONFIGURABLE HANGER

(71) Applicants: Sonal Dave, Portland, OR (US); Stacy Hamm, Portland, OR (US)

(72) Inventors: Sonal Dave, Portland, OR (US); Stacy Hamm, Portland, OR (US)

(*) Notice: Subject to any disclaimer, the term of this patent is extended or adjusted under 35 U.S.C. 154(b) by 0 days.

(21) Appl. No.: 15/724,040

(22) Filed: Oct. 3, 2017

(65) Prior Publication Data

US 2018/0092483 A1 Apr. 5, 2018

Related U.S. Application Data

(60) Provisional application No. 62/404,120, filed on Oct. 4, 2016.

(51) Int. Cl.
*A47G 29/08* (2006.01)
*H04M 1/04* (2006.01)

(52) U.S. Cl.
CPC ............ *A47G 29/083* (2013.01); *H04M 1/04* (2013.01)

(58) Field of Classification Search
CPC ....... H04M 1/04; A47G 29/083; A47G 29/00; A47G 25/0607; B60R 7/10; B65B 67/1227; F16B 45/00
USPC .................................................. 248/339, 308
See application file for complete search history.

(56) References Cited

U.S. PATENT DOCUMENTS

| | | | |
|---|---|---|---|
| 2,532,255 A * | 11/1950 | Davis | A47G 29/083 248/215 |
| D244,883 S | 6/1977 | Rohrmuller | |
| 4,194,714 A | 3/1980 | Schultz | |
| 4,302,046 A | 11/1981 | Lazazzero | |
| 4,403,488 A | 9/1983 | Engle et al. | |
| 4,416,315 A | 11/1983 | Foley | |
| D279,245 S | 6/1985 | Wohlman | |
| 4,670,909 A | 6/1987 | Forrester | |
| D297,074 S | 8/1988 | Burke et al. | |
| D300,882 S | 5/1989 | Olson | |
| 4,978,093 A | 12/1990 | Kennedy | |
| 5,026,321 A | 6/1991 | Benson | |
| 5,094,417 A | 3/1992 | Creed | |
| 5,149,114 A | 9/1992 | Lewandowski et al. | |
| 5,438,184 A | 8/1995 | Roberts et al. | |
| 5,458,301 A | 10/1995 | Cournoyer | |
| 5,509,545 A | 4/1996 | Banke | |
| 5,535,797 A | 7/1996 | Martindale | |
| D377,866 S | 2/1997 | Samples | |
| 5,770,844 A | 6/1998 | Henn | |
| D409,399 S | 5/1999 | Robinson | |
| 5,934,637 A | 8/1999 | Robinson | |
| D425,315 S | 5/2000 | Cassler | |
| D429,899 S | 8/2000 | Schwartz | |
| D435,733 S | 1/2001 | Osterholt | |
| D456,280 S | 4/2002 | Osterholt et al. | |

(Continued)

*Primary Examiner* — Christopher Garft (74) *Attorney, Agent, or Firm* — McCoy Russell LLP (57) ABSTRACT

Method and systems are provided for a reconfigurable hanger for holding or hanging objects. In one example of the reconfigurable hanger, two portions that may be angled relative to one another may be connected by a hinge that provides a stopping point when the two portions form an obtuse angle relative to one another. The first portion may include a flexible pad to provide friction when in contact with a supporting surface and a hooked end may be arranged on the second portion to prevent an object from sliding off the reconfigurable hanger.

15 Claims, 6 Drawing Sheets

(56) References Cited

U.S. PATENT DOCUMENTS

| | | |
|---|---|---|
| 6,766,181 B1 | 7/2004 | Newman et al. |
| 6,895,696 B1 | 5/2005 | Sanders |
| 6,959,873 B2 | 11/2005 | Kayanakis et al. |
| D517,732 S | 3/2006 | Osterholt et al. |
| 7,039,617 B1 | 5/2006 | Droege et al. |
| 7,234,672 B1 | 6/2007 | Osterholt et al. |
| D551,481 S | 9/2007 | Loveless |
| D578,802 S | 10/2008 | Russell et al. |
| 7,468,665 B2 | 12/2008 | Grundy |
| D595,518 S | 7/2009 | Zapanta |
| D596,859 S | 7/2009 | Castaline et al. |
| D599,188 S | 9/2009 | Ingalsbe et al. |
| 7,644,900 B2 | 1/2010 | Yap et al. |
| D617,997 S | 6/2010 | Johnson et al. |
| D624,758 S | 10/2010 | Seehoff |
| 7,828,258 B2 | 11/2010 | Shigio et al. |
| 7,837,171 B1 | 11/2010 | Otake |
| 7,861,726 B1 | 1/2011 | Lukasavitz |
| D642,045 S | 7/2011 | Sweeney |
| 8,061,669 B2 | 11/2011 | Yap et al. |
| D658,113 S | 4/2012 | Henderson |
| 8,371,546 B2 | 2/2013 | Bauerly |
| 8,371,564 B2 | 2/2013 | Asada |
| D679,095 S | 4/2013 | Williams et al. |
| 8,585,002 B2 | 11/2013 | Ho |
| 8,668,177 B2 | 3/2014 | Stein et al. |
| 8,702,050 B2 * | 4/2014 | Cohen ................. A47G 29/083 208/308 |
| 8,874,129 B2 | 10/2014 | Forutanpour et al. |
| 9,004,426 B2 | 4/2015 | Taveras |
| 9,216,700 B2 | 12/2015 | Gordon |
| 9,364,061 B2 | 6/2016 | Lewis |
| 9,430,102 B2 | 8/2016 | Prest et al. |
| D767,907 S | 10/2016 | Goodman et al. |
| 9,495,526 B2 | 11/2016 | Hanna |
| 9,569,778 B2 | 2/2017 | Hanna |
| D781,684 S | 3/2017 | Sweeney |
| 9,731,657 B1 | 8/2017 | Salter et al. |

\* cited by examiner

RECONFIGURABLE HANGER

CROSS-REFERENCE TO RELATED APPLICATION

This application claims priority to U.S. Provisional Patent Application No. 62/404,120, entitled "RECONFIGURABLE DEVICE" filed Oct. 4, 2016, the entire contents of which are hereby incorporated by reference for all purposes.

FIELD

The present application relates to a device for hanging and/or holding objects, such as bags, purses, mobile devices, etc.

BACKGROUND AND SUMMARY

A device for hanging and/or holding objects, such as a hanger, may use a combination of curved and straight edges to maximize the number of surfaces upon which it may be used, while still enabling the hanger to be positioned in an easily-stored configuration. The hanger may use a hinged connection to enable a variety of holding functions and be formed from a strong, rigid material to ensure a structural integrity that is capable of supporting the weight of a hanging object. When holding a hanging object, the hanger may be supported by surfaces such as tables, bathroom stall doors, bathroom stall walls, handicapped railings in bathrooms, railings, airline trays, as well as other surfaces of different textures and topography. This enables hanging objects, such as purses, handbags, other bags, jackets, helmets, etc. to be elevated above floors or other lower surfaces. The device may be used to avoid items from being soiled when placed on the floor/ground, to keep items out of the way of passersby in restaurants, to provide alternative storage options by hanging items when space is limited, such as at a small desk or table, and to allow increased security for items to be placed in view in a restaurant (as opposed to on the back of a chair or placed on the ground out of view).

However, the inventors herein have recognized potential issues with such hangers. There may be a wide variety of surfaces, surface thicknesses, surface shapes, etc. on which the hanger may be placed that may not allow for secure placement of the hanger to support a hanging object. Furthermore, in enabling a hanger to be capable of supporting the weight of a hanging object by forming the hanger from a rigid and strong material, the hanger may not be sufficiently lightweight and portable for easy carrying and storage by users while traveling.

The inventors herein have recognized that the issues described above may be addressed by a reconfigurable hanger comprising a first portion, a second portion, and two configurations. The first portion may have a flat external surface and may also include a flexible pad disposed in the surface of the first portion. The reconfigurable hanger may be positioned so the surface of the first portion with the flexible pad is in face-sharing contact with a supporting surface. The second portion of the reconfigurable hanger includes a hook and may be mated at one end to an end of the first portion via a hinged connection about which the second portion may be pivoted. The pivoting of the second portion enables two configurations of the reconfigurable hanger, with the first arrangement comprising the first and second portions aligned in a common plane. In the second configuration, the second portion is angled with respect to the first portion.

In this way, the reconfigurable hanger, when arranged in the second configuration, may be used to hang an object, such as a purse or bag, while being supported by a surface, such as a table top. In addition, the reconfigurable hanger may act as a holder for a media device, such as a mobile phone, journal, binder, e-reader, or tablet, maintaining the device in an upright position when placed on a surface. The reconfigurable hanger may provide a secure location to store a hanging object in the second configuration and allow for convenient storage and transport when arranged in the first configuration.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1A:
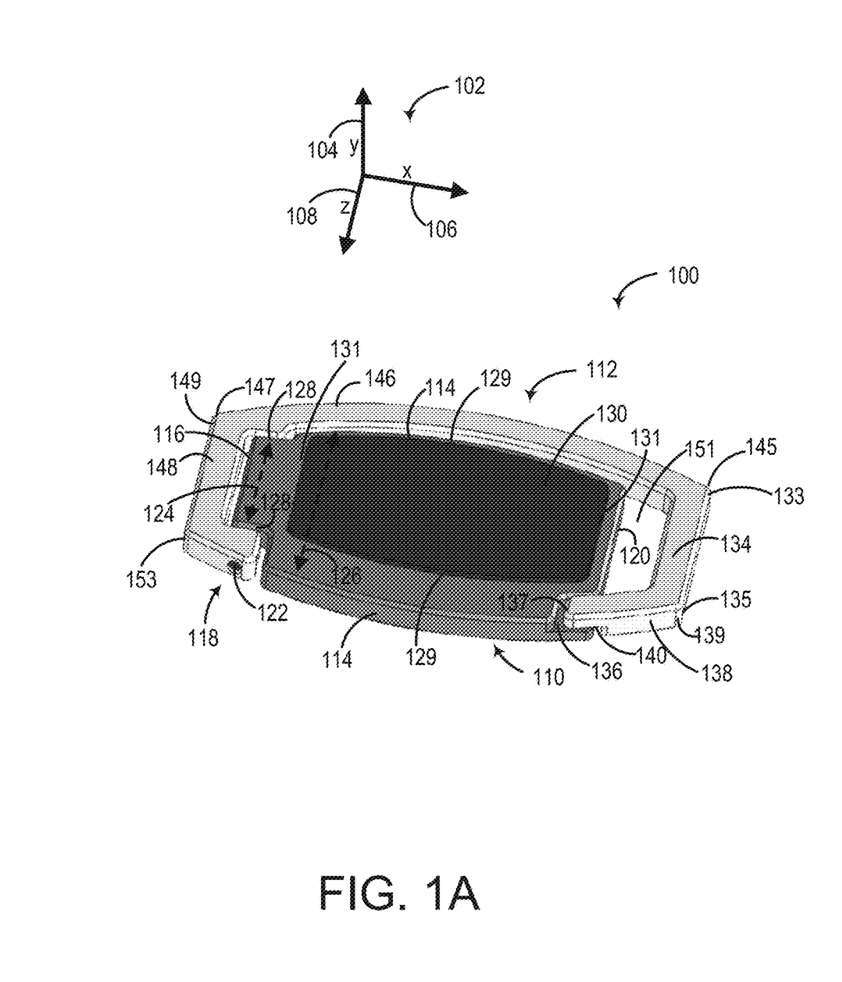
FIG. 1A-1B show a reconfigurable hanger in a planar arrangement and also a configuration where the hinged plate is pivoted to a maximum angle of rotation.
Figure 1B:
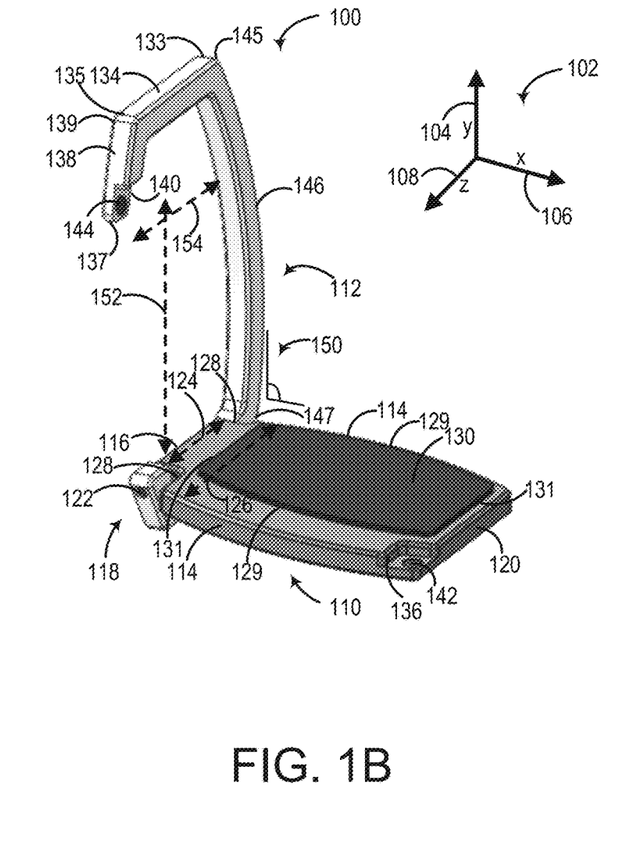
Figure 1C:
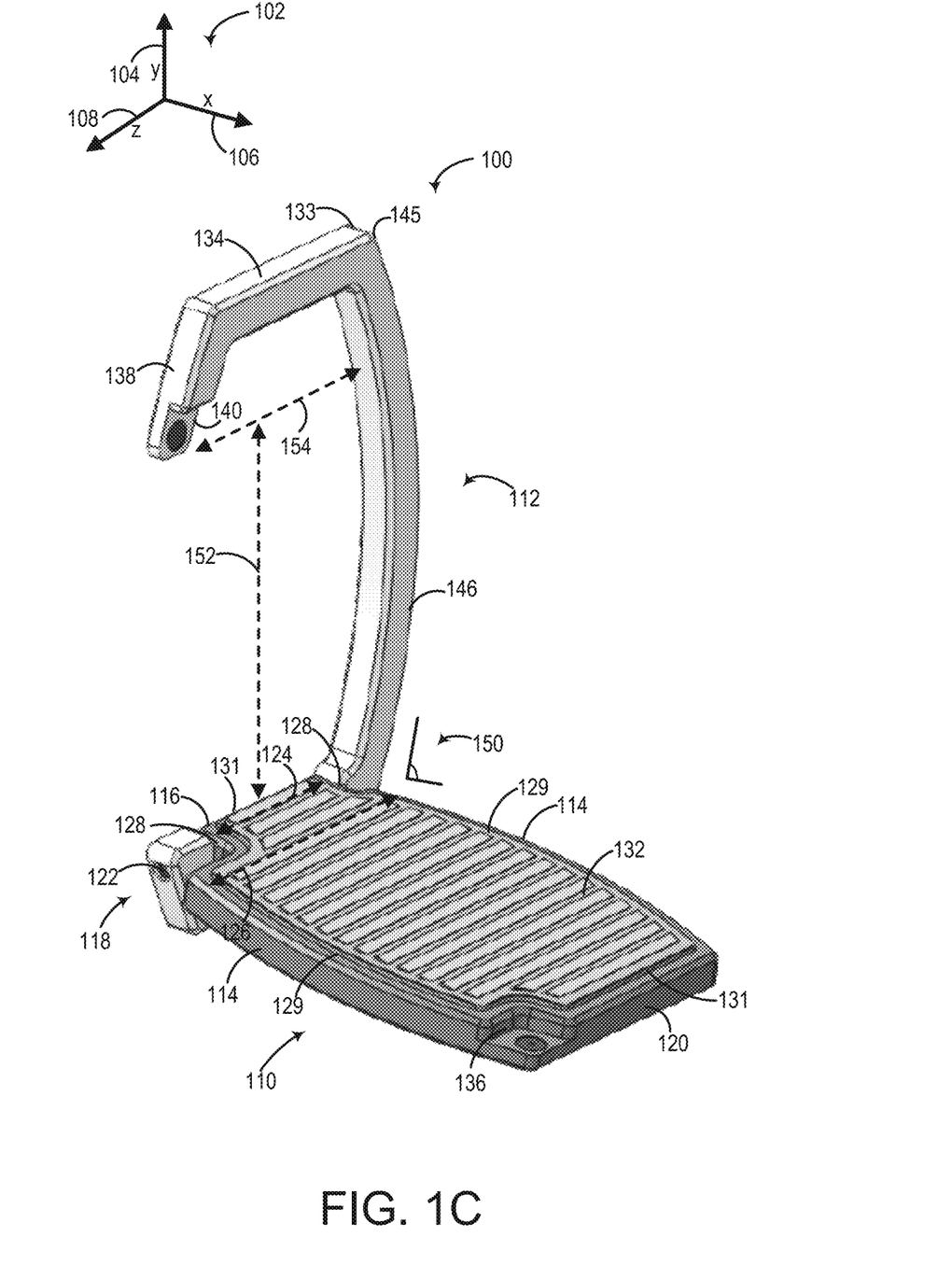
FIG. 1C shows the reconfigurable hanger with an alternative material for the flexible pad.
Figure 3:
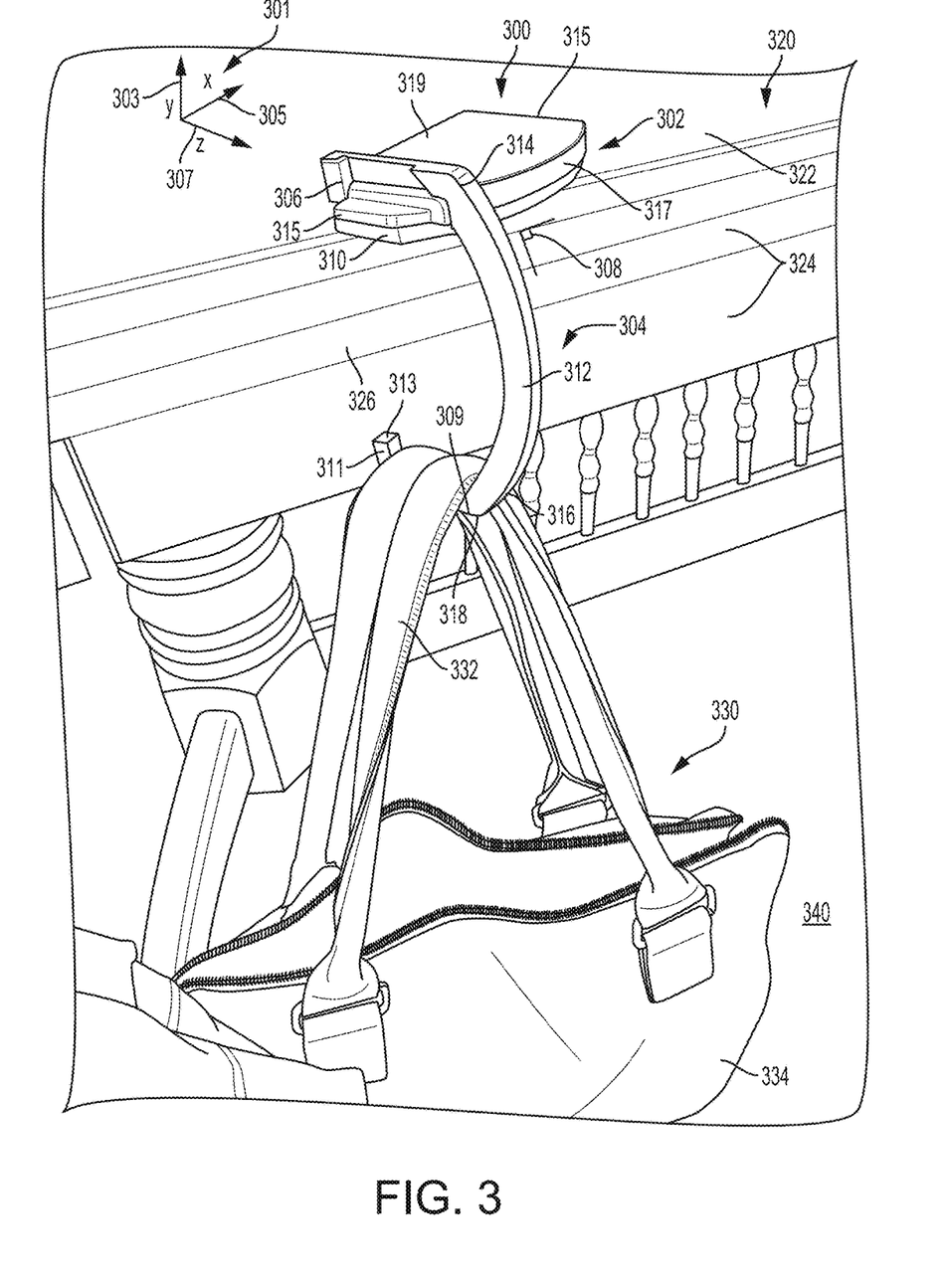
FIG. 3 shows the reconfigurable hanger supported on a table surface and carrying a purse.
Figure 4:
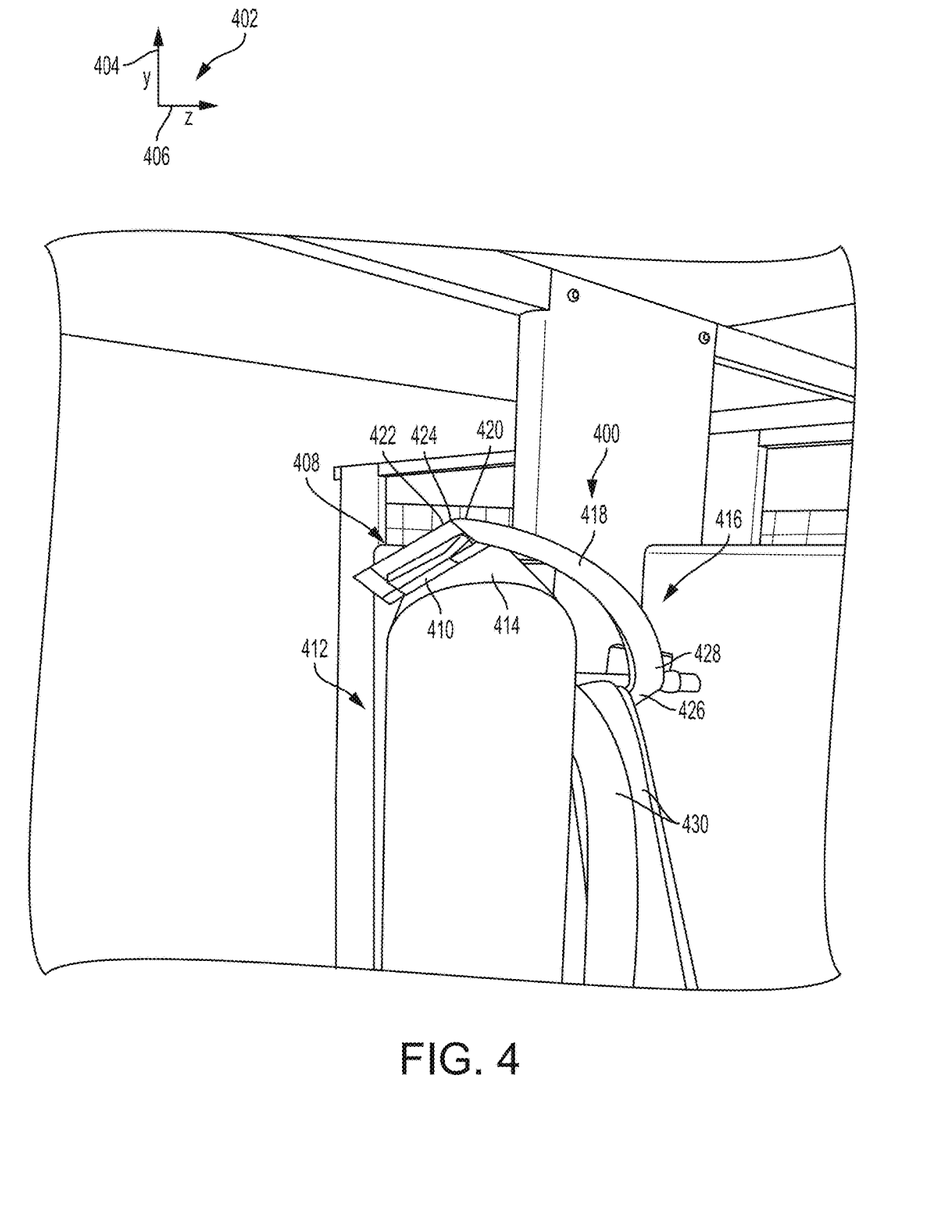
FIG. 4 shows a side view of the reconfigurable hanger supported over the top of a bathroom stall door and carrying a bag.
Figure 5:
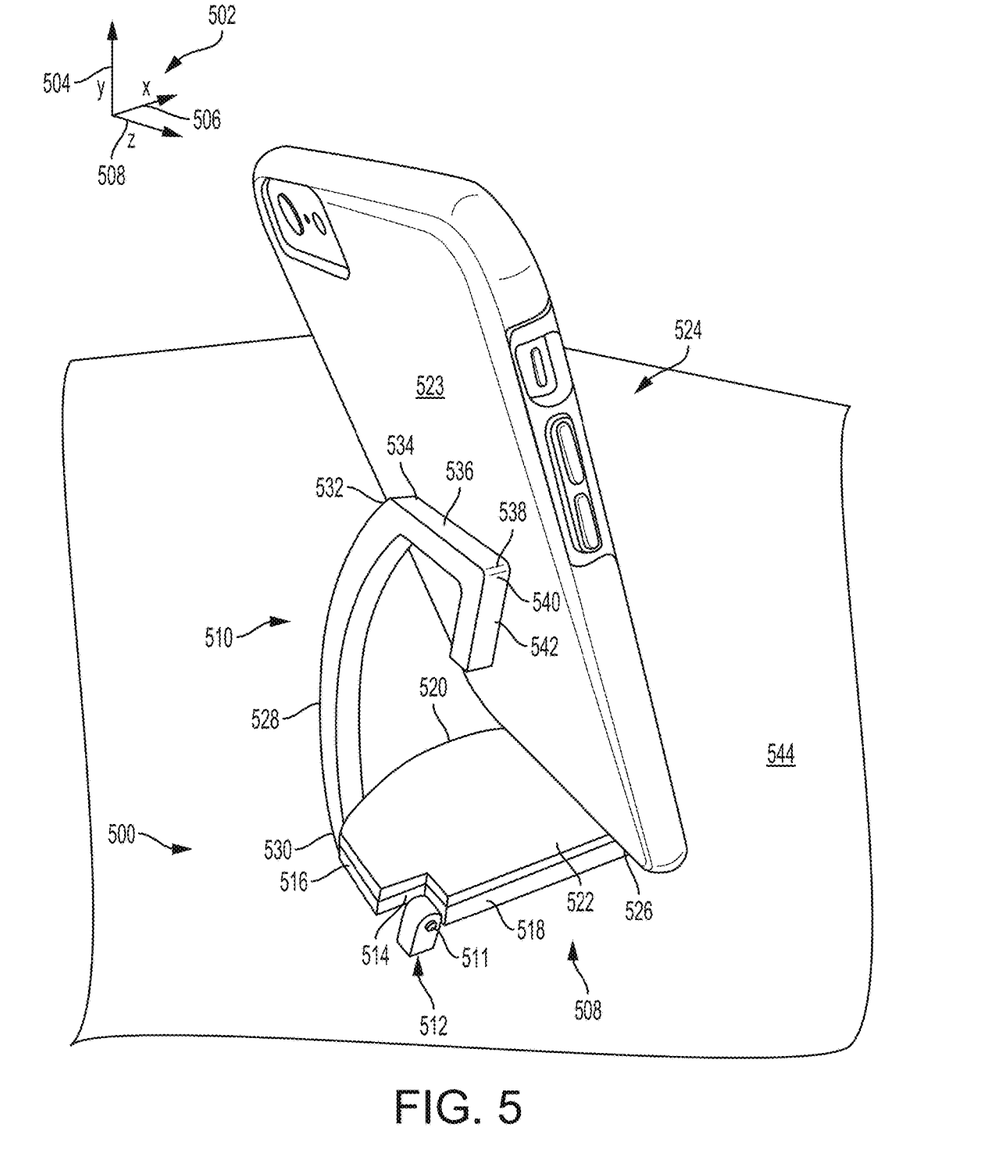
FIG. 5 shows the reconfigurable hanger supporting a mobile phone in an upright position.

The following description relates to systems and methods for a reconfigurable hanger. A reconfigurable hanger may comprise a base plate and a hinge plate which are rotatably coupled via a hinge joint, as shown in FIGS. 1A-1C. The planar and fully-pivoted configurations of the reconfigurable hanger are depicted in FIGS. 1A and 1B. The base plate may include a flexible pad, which may be substituted by a textured material, as illustrated in FIG. 1C. The individual elements comprising the reconfigurable hanger are shown in greater detail in an exploded view seen in FIG. 2. FIGS. 3-5 show examples of the reconfigurable hanger in use where the reconfigurable hanger is supported at the base plate by a surface and carries a purse hanging from the hinge plate in FIG. 3. In FIG. 4, a side view of the reconfigurable hanger is shown in a similar application as given in FIG. 3 but supported instead by the top of the door of a bathroom stall and carrying a bag on the hinge plate. In an alternate arrangement, the reconfigurable hanger is placed on a table surface in FIG. 5 so that the side of the base plate opposite from the side with the flexible pad is in contact with the table and the hinge plate is holding the back surface of a mobile device so that the mobile device is in an upright position.

Turning now to FIG. 1, a reconfigurable hanger 100 may include a base plate 110 and a hinge plate 112. References axes 102 are provided for comparison of views shown, depicting a vertical direction 104, a horizontal direction 106, and a lateral direction 108. Base plate 110 may have a set of sides 114 aligned in the horizontal direction 106 that are curved, a proximal end 116, relative to a hinge 118 and a distal end 120, relative to the hinge 118. The proximal and distal ends 116 and 120 may be straight and parallel to the lateral direction 108. The base plate 110 and the hinge plate 112 may be mated at the hinge 118 and secured with a dowel pin 122, which will be described hereafter in FIG. 2, about which the hinge plate 112 may be pivoted. A width 124 of the base plate 110 measured in the lateral direction 108 at the hinge 118 may be shorter than the width 126 at an area past the hinge towards the distal end of base plate 110 due to a set of cutouts 128 in the sides 114 of base plate 110. The cutouts 128 may accommodate the mating of the hinge plate 112 to the base plate 110 at the hinge 118 without interruptions in the outer shape of the reconfigurable hanger (e.g., the outer shape of the reconfigurable hanger when the base plate 110 and hinge plate 112 are arranged parallel to the plane formed by the lateral direction 108 and horizontal direction 106 as shown in FIG. 1A).

Base plate 110 may have a planar surface aligned along the plane formed by the lateral direction 108 and the horizontal direction 106 that may include a flexible pad 130. Flexible pad 130 may have a set of curved sides 129 parallel to the horizontal direction 106 and a set of ends 131 that are parallel to the lateral direction 108. The length and width of flexible pad 130, as measured in the horizontal direction 106 and lateral direction 108, may be smaller than the length and width of base plate 110, also measured in the horizontal and lateral directions 106 and 108. Flexible pad 130 may be arranged off-center, as seen in FIGS. 1A-1B, relative to the base plate 110, e.g., closer to one curved side 114 of the base plate 110 than the other curved side 114 to accommodate a first recess 136 in base plate 110 and closer to the distal end 120 than the proximal end 116 of the base plate 110. In another embodiment, as shown in FIG. 1C, the flexible pad 130 may be centered over base plate 110 and include cut-outs to match the cut-outs 128 and first recess 136 in base plate 110.

In one example, the flexible pad 130 may be a neoprene pad, as shown in FIGS. 1A-1B, with an adhesive back to couple with the base plate. In another example, as illustrated in FIG. 1C, the flexible pad 132 may be formed from textured rubber or silicone to provide more friction when in contact with a smooth surface. The flexible pad 130 and 132 may reduce the potential for the reconfigurable hanger 100 to slide from the surface upon which it is supported. Furthermore, the deformation of the flexible pad 130 and 132 may accommodate curvature or uneven textures in the supporting surface, such as the tops of bathroom stall doors or handicapped railings. Additionally the top planar surface flexible pad 130 and 132 may protrude beyond the top planar surface of the base plate 110, in the vertical direction 104, by an amount which prevents the reconfigurable hanger 100 from "bottoming out", e.g., when the rigid surface of the base plate 110 comes in pressurized contact with the surface while carrying heavy items and thereby avoiding metal damage in examples where base plate 110 is formed from a metallic material.

As seen in FIG. 1A, there may be a gap 151 between the distal end 120 of base plate 110 and a distal end 134, relative to the hinge 118, of hinge plate 112. The gap 151 may ensure clearance between the distal end 120 of the base plate 110 and the distal end 134 of the hinge plate when base plate 110 and hinge plate 112 are aligned parallel and base plate 110 is surrounded by hinge plate 112. Base plate 110 may also include the first recess 136 in a top surface of base plate 110 that mates with a second recess 140 disposed in a side 138 of hinge plate 112. The coupling of the first and second recesses 136 and 140 may allow the hinge plate 112 and base plate 110 to lie flat relative to one another and in a common plane when the base plate 110 is surrounded by hinge plate 112.

As seen in FIGS. 1B-1C, a first magnetic pole 142 may be disposed in the first recess 136 of base plate 110 and a second magnetic pole 144 may be arranged in the second recess 140 of hinge plate 112, where the first and second magnetic poles 142 and 144 are of opposite polarities. When first recess 136 is mated to second recess 140, the attraction between the first and second magnetic poles 142 and 144 may maintain the positions of the base plate 110 and hinge plate 112 parallel and flush relative to one another against gravity or against contact with objects in motion during transport. In one example, the first and second magnetic poles 142 and 144 may be formed from neodymium. In other examples, however, the reconfigurable hanger 100 may not include magnetic poles 142 and 144 or may position the magnetic poles 142 and 144 to couple different areas of reconfigurable hanger 100.

The hinge plate 112 may be formed from a same or different material as base plate 110 and is C-shaped. Hinge plate 112 may include a curved side 146 that connects at a first end 145 to a first end 133 of the distal end 134 and at a second end 147 of the curved side 146 to a first end 149 of a proximal end 148 of hinge plate 112, as shown in FIG. 1A. Hinge plate 112 may also include the side 138 which is curved and attached at a first end 139 to a second end 135 of distal end 134 of hinge plate 112. The side 138 extends from the second end 135 of the distal end 134 of hinge plate 112 in the horizontal direction 106 towards the hinge 118 but the second end 137 of side 138 does not connect to a second end 153 of the proximal end 148 of hinge plate 112. Side 138 may prevent the handles or straps of a purse or bag being carried by the reconfigurable hanger 100 from slipping off the hinge plate 112. The curvature of side 146 may allow the hinge plate 112 to fit around a curved edge of a supporting surface such as, for example, the edge of a curved table. The dimensions, e.g., length, width, and curvature of the sides 138 and 146 of hinge plate 112 may be adapted to allow base plate 110 to be enclosed within hinge plate 112 without the outer edges of base plate 110 coming in contact with the inner edges of hinge plate 112, and includes thicker portions of hinge plate 112 adjacent to the cutouts 128 in base plate 110, when hinge plate 112 is pivoted to be in a common plane with base plate 110, herein referred to as a closed position, as seen in FIG. 1A.

The hinge plate 112 may be pivoted vertically, towards the vertical direction 104, about hinge 118, with dowel pin 122 acting as a fulcrum, to an angle 150 which may be stopped at a maximum degree of rotation relative to the plane of the base plate 110, as shown in FIGS. 1B-1C. In one example, the angle 150 may be a maximum of 105 degrees. In another example, the hinge plate 112 may be rotated, relative to the base plate 110, up to 115 degrees. In yet another example, the pivoting of the hinge plate 112 may be stopped at 130 degrees, or 160 degrees, or an angle smaller than 180 degrees. As such, it is appreciated that the scope of the present disclosure should not be limited by the angle through which the hinge plate 112 may be rotated as described herein.

In this configuration, the hinge plate 112 may be aligned with the plane formed by the vertical direction 104 and the lateral direction 108 and is herein referred to as an open position. The pivoting of hinge plate 112 about hinge 118 may be stopped at 105 degrees due to contact between the hinge 118 and the base plate 110. A distance 152 between an end of the side 138 of the hinge plate 112 and a top surface of the base plate 110, as measured in the vertical direction 104, and a width 154 between an end of the side 138 and the side 146 of the hinge plate 112, as measured in the lateral direction 108, may be tall and wide enough to accommodate bulky purse/bag straps/handles or other items such as jackets or helmet straps. In one example of the reconfigurable hanger 100, the distance 152 may be 2.47 inches, which is tall enough to fit around many table top thicknesses.

In one example, reconfigurable hanger 100 may be formed from a rigid, lightweight material such as molded plastic. In another example, reconfigurable hanger 100 may be formed from anodized aluminum. In yet another example, one portion of the reconfigurable hanger 100 may be formed of a first material and the second portion may be formed from a second, different material. It may be appreciated that the function of the reconfigurable hanger described herein should not limited by the type or combination of materials from which it may be formed.

Figure 2:
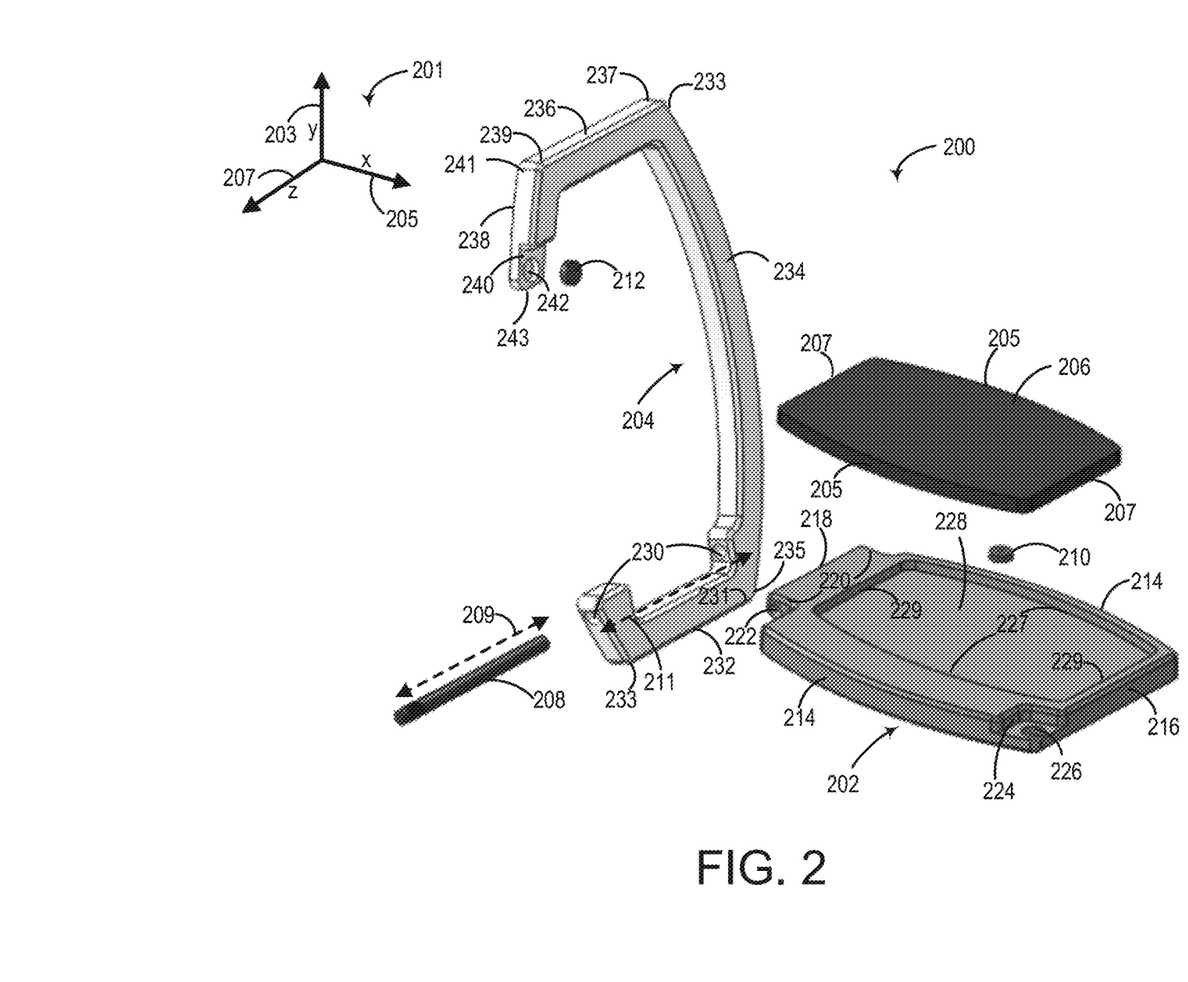
FIG. 2 shows an exploded view of the reconfigurable hanger.

An exploded view of a reconfigurable hanger 200, which may be used similarly as the reconfigurable hanger 100 in FIGS. 1A-1C, is illustrated in FIG. 2. References axes 201 are provided for comparison of views shown, depicting a vertical direction 203, a horizontal direction 205, and a lateral direction 207. The reconfigurable hanger 200 may include a base plate 202, a hinged plate 204, a flexible pad 206, a dowel pin 208, a first magnetic pole 210 and a second magnetic pole 212. The base plate 202 may have a set of curved side edges 214, a distal end 216 and a proximal end 218, relative to a hinge, such as hinge 118 in FIGS. 1A-1C, with the distal and proximal ends 216 and 218 being straight. Proximal end 218 includes cutouts 220 and an aperture 222 extending across the width, in the lateral direction 207, of the proximal end 218.

A first recess 224 may be arranged at an intersection of the distal end 216 and the side 214 of base plate 202. Within the first recess 224 is a second recess 226 which may be circular and designed to contain the first magnetic pole 210 so that the magnetic pole 210 may be secured to the base plate 202 by being placed in second recess 226. Base plate 202 may have a third recess 228 that is larger than the first and second recesses 224 and 226, and may be adapted to contain flexible pad 206, having a depth, in the vertical direction 203, optimized to allow the flexible pad 206 to extend, in the vertical direction 203, beyond the planar surface of the base plate 202, as shown in FIGS. 1A-1B. The third recess 228 may be arranged off-center relative to base place 202, e.g., closer to one curved side 214 than the other curved side 214 of base plate 202 and closer to the distal end 216 than the proximal end 218 of base plate 202. The third recess 228 may have a set of curved sides 227 that match a set of curved sides 205 of flexible pad 206 and a set of straight ends 229 that match a set of straight ends 207 of flexible pad 206. In this way, flexible pad 206, which may be formed from neoprene, textured rubber, or silicone as described above, may be placed in the third recess 228 and secured to recess 228 via an adhesive added to the bottom surface of flexible pad 206.

A set of apertures 230 are included at a proximal end 232, relative to a hinge, such as hinge 118 in FIG. 1, of the hinge plate 204. The apertures 230 in hinge plate 204 and the aperture 222, extending across the width of the proximal end 218 of base plate 202, are adapted to accept the insertion of dowel pin 208 when the aperture 222 at the proximal end 218 of base plate 202 and the apertures 230 at the proximal end 232 of hinge plate 204 are aligned, such as the arrangements shown in FIGS. 1A-1C. A length 209 of the dowel pin 208, measured in the lateral direction 207, is equal to or greater than a width 211, also measured in the lateral direction 207, of the hinge plate 204 at the apertures 230. In this way the hinge plate 204 and base plate 202 may be connected by inserting dowel pin 208 through apertures 230 of the hinge plate 204 and aperture 222 of base plate 202 and the hinge plate 204 may rotate to a of 105 degrees with respect to base plate 202, with the dowel pin 208 as a fulcrum. The dowel pin 208 may be, as one example, a press-fit pin and thereby held in place within the apertures 222 and 230 by contact pressure between the inner surfaces of the apertures 222 and 230 and the outer surface of dowel pin 208.

The hinge plate 204 in FIG. 2 is C-shaped, aligned in the plane formed by vertical direction 203 and lateral direction 207 and has thicker portions, measured along the lateral direction 207, at the proximal end 232 adjacent to the cutouts 220 in base plate 202 when the hinge plate 204 and base plate 202 are connected at the hinge, such as the hinge 118 in FIGS. 1A-1C. Hinge plate 204 has a first curved side 234 that connects at a first end 235 to a first end 231 of proximal end 232 and connects at a second end 233 to a first end 237 of a distal end 236 of hinge plate 204, where the proximal and distal ends 232 and 236 are straight and aligned in the lateral direction 207. A first end 241 of a second curved side 238, aligned in the vertical direction 203, is attached to a second end 239 of the distal end 236 and extends downwards in the vertical direction 203 but does not connect to the proximal end 232. A second end 243 of the second curved side 238 has a first recess 240, which is adapted to couple with the first recess 224 in base plate 202 to allow reconfigurable hanger 200 to be flat when in the closed position, as depicted in FIG. 1A. Within first recess 240 of hinge plate 204 is a second, circular, recess 242 which is configured, similar to the first and second recesses 224 and 226 in base plate 202, to contain and secure the second magnetic pole 212 to the hinge plate 204. The first and second magnetic poles 210 and 212 have opposite polarities and may be formed from neodymium or another magnetic metal. When mated together, magnetic poles 210 and 212 maintain the reconfigurable hanger 200 in a closed position until the user exerts force on the hinge plate 204 to pivot the hinge plate 204 to the open position.

An embodiment of a reconfigurable hanger 300, which may also be reconfigurable hangers 100 and 200 in FIGS. 1A-2, is shown in FIG. 3 carrying a handbag 330 and supported on a table 320. References axes 301 are provided for comparison of views shown, depicting a vertical direction 303, a horizontal direction 305, and a lateral direction 307. The reconfigurable hanger 300 includes a base plate 302 and a hinge plate 304. The base plate 302 and hinge plate 304 are coupled by a hinge 306, about which the hinge plate may be pivoted to an angle 308 of 105 degrees. The base plate 302 has a set of two straight edges 315, a third, longer, straight edge 319 that is perpendicular to and disposed in between the two straight edges 315, and opposite a curved side 317. In another embodiment, such as reconfigurable hanger 100 in FIGS. 1A-1C, the reconfigurable hanger 300 may have two straight edges and two curved sides, with the curved sides being longer than the straight edges. It may be appreciated that the function of the reconfigurable hanger described herein should not be limited by the number of curved sides relative to straight edges.

The reconfigurable hanger 300 is oriented upside-down relative to the reconfigurable hangers 100 shown in FIGS. 1A-1C with the planar surface of the base plate 302 positioned so that the flexible pad 310 attached to the surface of base plate 302 is facing down and in contact with a table top 322 of the table 320. The planar surfaces of the table top 322, base plate 302, and flexible pad 310 are aligned with the plane formed by horizontal direction 305 and lateral direction 307. The flexible pad 310 may be formed from neoprene, rubber, or silicone, as described above, and may provide friction when in contact with a smooth surface, such as table top 322. In this way, the slipping or sliding of reconfigurable hanger 300 off of the table top 322 may be avoided when the reconfigurable hanger 300 is carrying a load, such as the handbag 330.

The hinge plate 304 may be C-shaped with a first curved side 312 extending down, along the vertical direction 303, and at an obtuse angle relative to base plate 302. A first end 314 of curved edge 312 may be coupled to the hinge 306 and a second end 316 of curved edge 312 may be connected to a first end 318 of a distal end, relative to the hinge 306, of the hinge plate 304. The distal edge 309 may be straight and in contact with a set of straps 332 of handbag 330. The straps 332 may be arranged over distal edge 309 so that the handbag 330 hangs from distal edge 309 via the straps 332. A second end (not shown) of distal edge 309 may be coupled to a second side 311 of hinge plate 304 where the second side 311 is shorter in length, along the vertical direction 303, than the first curved side 312 and does not connect to the hinge 306. The second side 311 may prevent the straps 332 of handbag 330 from sliding off the distal end 309 of hinge plate 304.

When reconfigurable hanger 300 is placed proximate to a table edge 324 of the table 320, as shown in FIG. 3, reconfigurable hanger 300 may be angled relative to the table edge 324 to allow as much of the flexible pad 310 to be in contact with the table top 322 as possible. The first curved side 312 of hinge plate 304, when in the open position as shown in FIG. 3, may extend down and along the table edge 324. The curvature of the first curved side 312 may accommodate a lip 326 that extends outwards in the lateral direction 307 from table edge 324 while still allowing the flexible pad 310 if base plate 302 to remain in contact with the table top 322. The space between a first end 313 of second side 311 of hinge plate 304 and planar surface of flexible pad 310 allows clearance for the arrangement of the straps 332 over the distal end 309 of hinge plate 304.

The reconfigurable hanger 300 enables the suspension of handbag 300 from the table 320, allowing a body 334 of the handbag 300 to be spaced away from a floor 340. This arrangement may accommodate the positioning of the handbag 300 closer to the owner and within direct view than if the handbag 300 were placed on the floor 340 or on the back of a chair. This also prevents the body 334 of the handbag 300 from being soiled when placed on the floor 340.

Another example of a reconfigurable hanger 400, which may be reconfigurable hanger 100 in FIGS. 1A-C or 300 in FIG. 3, seen from a side view is shown in FIG. 4. A set of reference axes 402 is provided for comparison of views shown, indicating the vertical direction 404 and lateral direction 406. The reconfigurable hanger 400 may be oriented similarly to reconfigurable hanger 300 in FIG. 3 with a base plate 408 positioned so the flexible pad 410 arranged on a surface of the base plate is facing down. Flexible pad 410 may be in face-sharing contact with a top edge 414 of a bathroom stall door 412. The top edge 414 of the bathroom stall door 412 may be curved, and the curvature of the top edge 414 of the bathroom stall door 412 may be accommodated by the extension of the flexible pad 410 beyond the surface of the base plate 408, as illustrated by flexible pad 130 in FIGS. 1A-1B and flexible pad 310 in FIG. 3. The curvature of the top edge 414 of the bathroom stall door 412 may also be accommodated by the curvature of a curved side 418 of a hinge plate 416. The hinge plate 416 may be coupled at a first end 420 to a proximal end 422 of base plate 408 via a hinge 424.

The curved side 418 of the hinge plate 416 may be pivoted to extend away from the base plate 408 in a direction perpendicular to a planar surface of the base plate 408. The curved side 418 includes a distal end 426, coupled to a second end 428 of curved side 418, which is straight. A plurality of bag straps 430 may be arranged over distal end 426 from which a bag, such as handbag 330 in FIG. 3, may be suspended. Hinge plate 416 may be hooked at one end of the distal end 426, as shown in FIGS. 1A-3, preventing the bag straps 430 from slipping off distal end 426. The arrangement of reconfigurable hanger 400 over the bathroom stall door 412 while carrying an item, such as a handbag, suspended below the reconfigurable hanger 400 via straps 430, demonstrates how the reconfigurable hanger may be used to provide a location to hang a handbag as an alternative to placing the handbag on the floor of the bathroom stall.

An alternative orientation of a reconfigurable hanger 500, which may be the reconfigurable hanger 100 in FIGS. 1A-1C, reconfigurable hanger 300 in FIG. 3, or reconfigurable hanger 400 in FIG. 4, is shown in FIG. 5. A reference set of axes 502 is provided for comparison of views shown and indicates the vertical direction 504, the horizontal direction 506, and the lateral direction 508. The reconfigurable hanger 500 may include a base plate 508, a hinge plate 510, and a hinge 512 and is positioned so that the hinge plate 510, pivoted about the hinge 512 to be angled relative to the base plate 508, is extending upwards away from the base plate 508 along the vertical direction 504. The hinge 512 may also include a dowel pin 511 which may provide a fulcrum about which hinge plate 510 may be rotated and may secure the coupling of the base plate 508 and hinge plate 510 at the hinge 512.

Base plate 508 has a planar surface aligned with the plane formed by horizontal direction 506 and lateral direction 508 and includes a cut-out 514 to accommodate hinge 512, a straight edge 516 that is adjacent to the hinge 512, a straight side 518 and a curved side 520. A flexible pad 522 is disposed on a top surface of base plate 508 and covers an entirety of the top surface of base plate 508. In this arrangement, the flexible pad 522 provides friction between the flexible pad 522 and a bottom edge 526 of a mobile phone 524.

Hinge plate 510 may be pivoted to be angled relative to base plate 508 with the angle of rotation stopped at 105 degrees by contact between the base plate 508 and hinge plate 510. Hinge plate 510 may include a curved side 528, connected at a first end 530 to the hinge 512 and at a second end 532 of curved side 528 to a first end 534 of a distal edge 536 of hinge plate 510. Distal edge 536 may be straight and parallel to the planar surface of the base plate 508. A second end 538 of distal edge 536 may be connected to a first end 540 of a side 542 of hinge plate 510. While side 542 may be parallel to curved side 528, side 542 may be straight instead of curved and side 542 does not connect to the hinge 512. In some examples, such as reconfigurable hanger 100 in FIGS. 1A-1C, both the side 518 of base plate 508 may be curved and side 542 of hinge plate 510 may be similarly curved so that hinge plate 510 may fit around base plate 508 when reconfigurable hanger 500 is in the closed position.

Reconfigurable hanger 500 is depicted in FIG. 5 on top of a surface 544, such as a table top, and supporting the mobile device 524. The mobile device 524 may have a rectangular shape and may be arranged so that a rear planar surface 523 is tilted with respect to the plane formed by the vertical direction 504 and the lateral direction 508. The rear planar surface 523 of mobile phone 524 may be in contact with and leaning against the distal edge 536 of hinge plate 510, and the bottom edge 526, as described above, of mobile phone 524 may be in contact with the flexible pad 522 of base plate 508. In this way, the weight of the mobile phone 524 may be supported at two contact points with reconfigurable hanger 500 and also supported by the blocking of the rotation of hinge plate 510 by contact between base plate 508 and hinge plate 510 at the hinge 512.

In an open configuration, a reconfigurable hanger, such as reconfigurable hangers 100, 300, 400, and 500 in FIGS. 1A-1C, 3, 4, and 5, comprising a first and second portion, may be used in a first orientation to carry an item, such as a purse or bag, with a set of straps of the purse or bag arranged on a hooked end of the second portion. The flat first portion of the reconfigurable hanger may be in contact with a supporting surface such as a table or top edge of a door with a flexible pad disposed on a surface of the first portion and in face-sharing contact with the surface to provide friction. In this way, the item may suspended above a floor without sliding off the supporting surface or the reconfigurable hanger. A second orientation of the reconfigurable hanger in the open configuration allows the device to support an object, such as a mobile phone or tablet, in an upright position by providing two points of contact between the mobile phone and reconfigurable hanger. In a closed configuration, the two portions of the reconfigurable hanger lie flat in a common plane, allowing for easy storage during travel. The technical effect of the reconfigurable hanger is to utilize the angling of the first portion of the device relative to the second portion to support the weight of an object.

FIGS. 1A-5 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The following phrases particularly point out certain combinations and sub-combinations regarded as novel and non-obvious. They may refer to "an" element or "a first" element or the equivalent thereof. Such references should be understood to include incorporation of one or more such elements, neither requiring nor excluding two or more such elements. Other combinations and sub-combinations of the disclosed features, functions, elements, and/or properties may be claimed through amendment in this or a related application. Such concepts, whether broader, narrower, equal, or different in scope to the original disclosure, also are regarded as included within the subject matter of the present disclosure.

The invention claimed is:

1. A reconfigurable hanger comprising,
   a first and second portion wherein the first portion has a flat external surface and the second portion is shaped with a hook, the first and second portions each have a mating curved edge, the reconfigurable hanger having:
      a first configuration wherein the first and second portions are angled with respect to one another; and
      a second configuration wherein the first and second portions are aligned flat in a common plane,
   wherein the first portion is formed as a unitary flat plate with one or more straight edges and one or more curved edges,
   wherein a hinge axis extends along and parallel to one of the straight edges, the first portion having only two straight and two curved outer edges,
   wherein the second portion is approximately C-shaped, with one end aligned parallel with the hinge axis and an opposite end forming an open hook, with a flat curved member that is flat in a first plane and curved in a second plane, the flat curved member connecting the one end aligned with the hinge axis and the opposite end forming the open hook, a curve of the flat curved member complementary to one of the curved edges, and
   wherein an end point of the opposite end comes into edge contact with a straight edge of a base plate when in the first configuration.

2. The reconfigurable hanger of claim 1, further comprising a magnetic coupling to hold the reconfigurable hanger in the first configuration.

3. The reconfigurable hanger of claim 1, further comprising a pad positioned on a side of the base plate.

4. A reconfigurable hanger consisting essentially of:
   a first portion with a flat external surface with a pad and a first magnetic pole;
   a second portion shaped with an open hook and a second magnetic pole complementary to the first magnetic pole; and
   a hinged connection between only the first and second portions,
   wherein the first portion is formed as a unitary flat plate with one or more straight edges and one or more curved edges,
   wherein a hinge axis extends along and parallel to one of the straight edges, the first portion having only two straight and two curved outer edges,
   wherein the second portion is approximately C-shaped, with one end aligned parallel with the hinge axis and an opposite end forming the open hook, with a flat curved member that is flat in a first plane and curved in a second plane, the flat curved member connecting the one end aligned with the hinge axis and the opposite end forming the open hook, a curve of the flat curved member complementary to one of the curved edges, and wherein an end point of the opposite end comes into edge contact with a straight edge of a base plate when in a first configuration.

5. The reconfigurable hanger of claim 4, wherein the first portion forms two or more straight edges and one or more curved edges, the curved edges being greater in length than the straight edges disposed perpendicular to the curved edges.

6. The reconfigurable hanger of claim 4, wherein the first portion has a second flat external surface opposite the flat external surface.

7. The reconfigurable hanger of claim 4, wherein a planar surface of the first portion includes a recess.

8. The reconfigurable hanger of claim 7, wherein the recess included in the planar surface of the first portion is adapted to contain the pad.

9. The reconfigurable hanger of claim 7, wherein the planar surface of the first portion is entirely covered by the pad.

10. The reconfigurable hanger of claim 8, wherein the pad, when contained with the recess in the planar surface of the first portion, extends beyond the planar surface of the first portion.

11. The reconfigurable hanger of claim 4, wherein the second portion is adapted to pivot about the hinged connection relative to the first portion to a maximum of 105 degrees.

12. The reconfigurable hanger of claim 11, wherein the pivoting of the second portion is stopped at 105 degrees due to contact between the first portion and the second portion at an end at which the two portions are mated.

13. The reconfigurable hanger of claim 4, wherein the hinged connection is a dowel pin securing the mating of the first portion and the second portion at one end of both portions.

14. The reconfigurable hanger of claim 4, wherein in a first orientation the reconfigurable hanger is adapted to carry an item suspended above a first surface via the second portion and supported on a second surface by face-sharing contact between the first portion and the second surface and wherein in a second orientation the reconfigurable hanger supports an object in an upright position.

15. The reconfigurable hanger of claim 4, wherein the first portion includes a first recess and the second portion includes a second recess, the first recess of the first portion and the second recess of the second portion arranged so that when the first and second recesses are mated, the reconfigurable hanger is arranged in the first configuration, and the reconfigurable hanger lies flat with the first portion and the second portion aligned in a common plane.

* * * * *